United States Patent [19]
Anderson

[11] 3,810,731
[45] May 14, 1974

[54] APPARATUS FOR FORMING PLASTIC SHEETS

[75] Inventor: David P. Anderson, Lathrop Village, Mich.

[73] Assignee: Woodall Industries, Inc., Detroit, Mich.

[22] Filed: Aug. 1, 1972

[21] Appl. No.: 277,137

[52] U.S. Cl............... 425/388, 425/340, 425/435, 425/451, 425/436, 425/DIG. 200
[51] Int. Cl. ............................................. B29c 17/04
[58] Field of Search .......... 425/388, 451, 435, 436, 425/DIG. 200, 201, 343, 340

[56] References Cited
UNITED STATES PATENTS

| | | | |
|---|---|---|---|
| 3,044,117 | 7/1962 | Alspach et al. | 425/340 |
| 3,583,036 | 6/1971 | Brown | 425/388 X |
| 2,932,874 | 4/1960 | Ludwig et al. | 425/435 X |
| 3,025,566 | 3/1962 | Kostur | 425/388 |
| 3,632,249 | 1/1972 | Pearson | 425/451 |

Primary Examiner—Robert L. Spicer, Jr.
Attorney, Agent, or Firm—Harness, Dickey & Pierce

[57] ABSTRACT

There is herein disclosed a vacuum forming machine having a plurality of processing stations connected by an endless track on which forming frames carry plastic sheet material from station to station.

22 Claims, 26 Drawing Figures

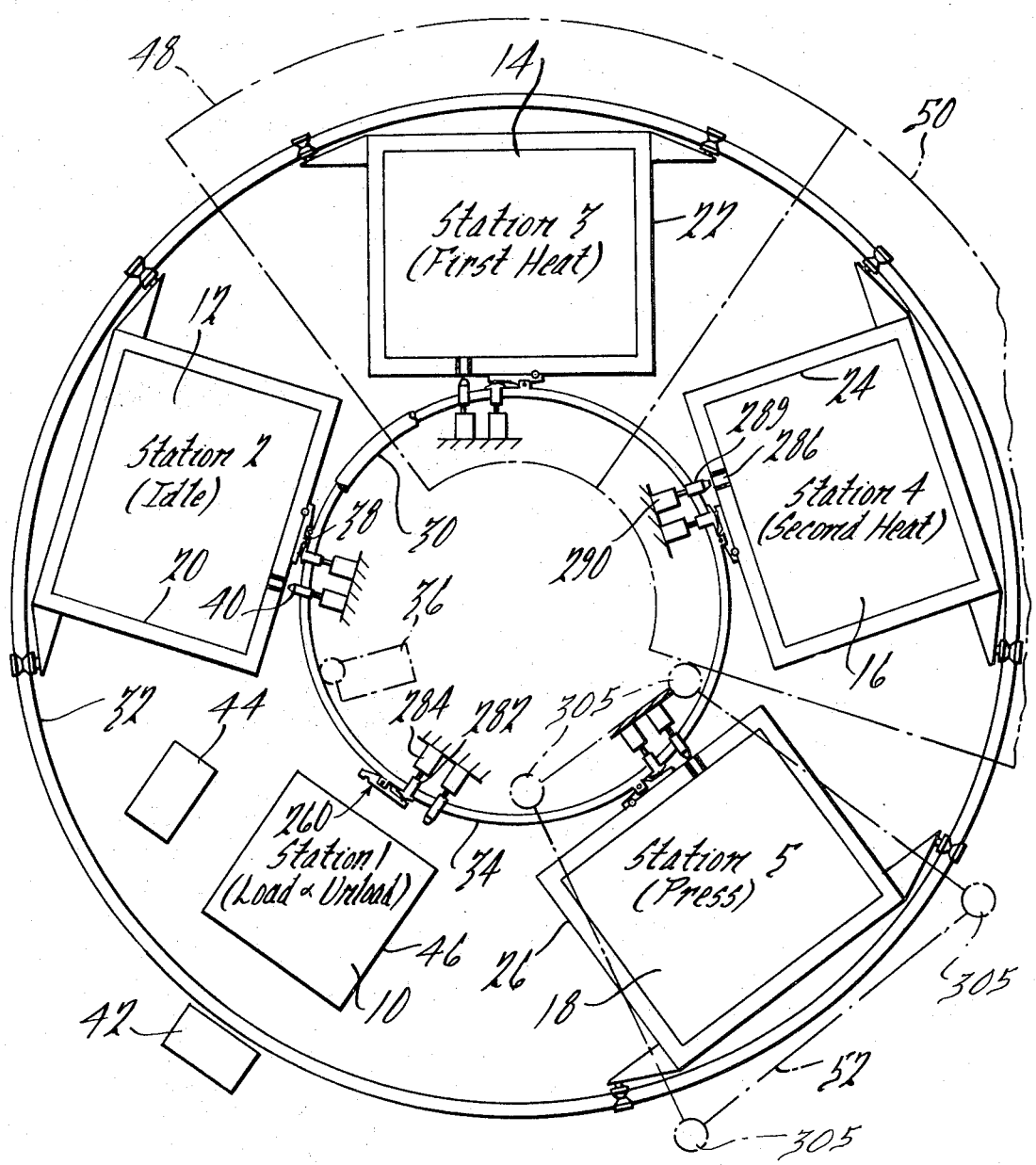

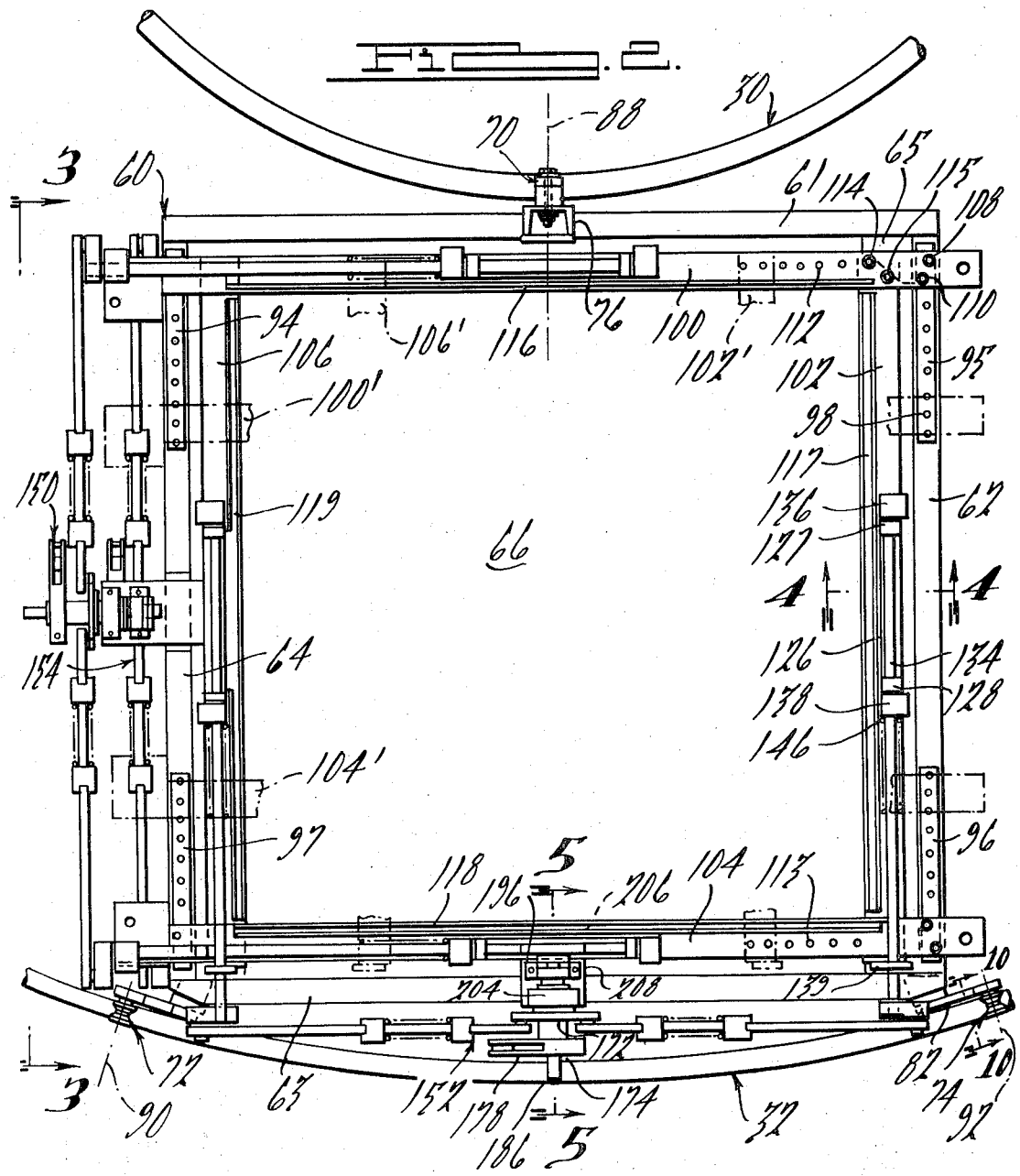

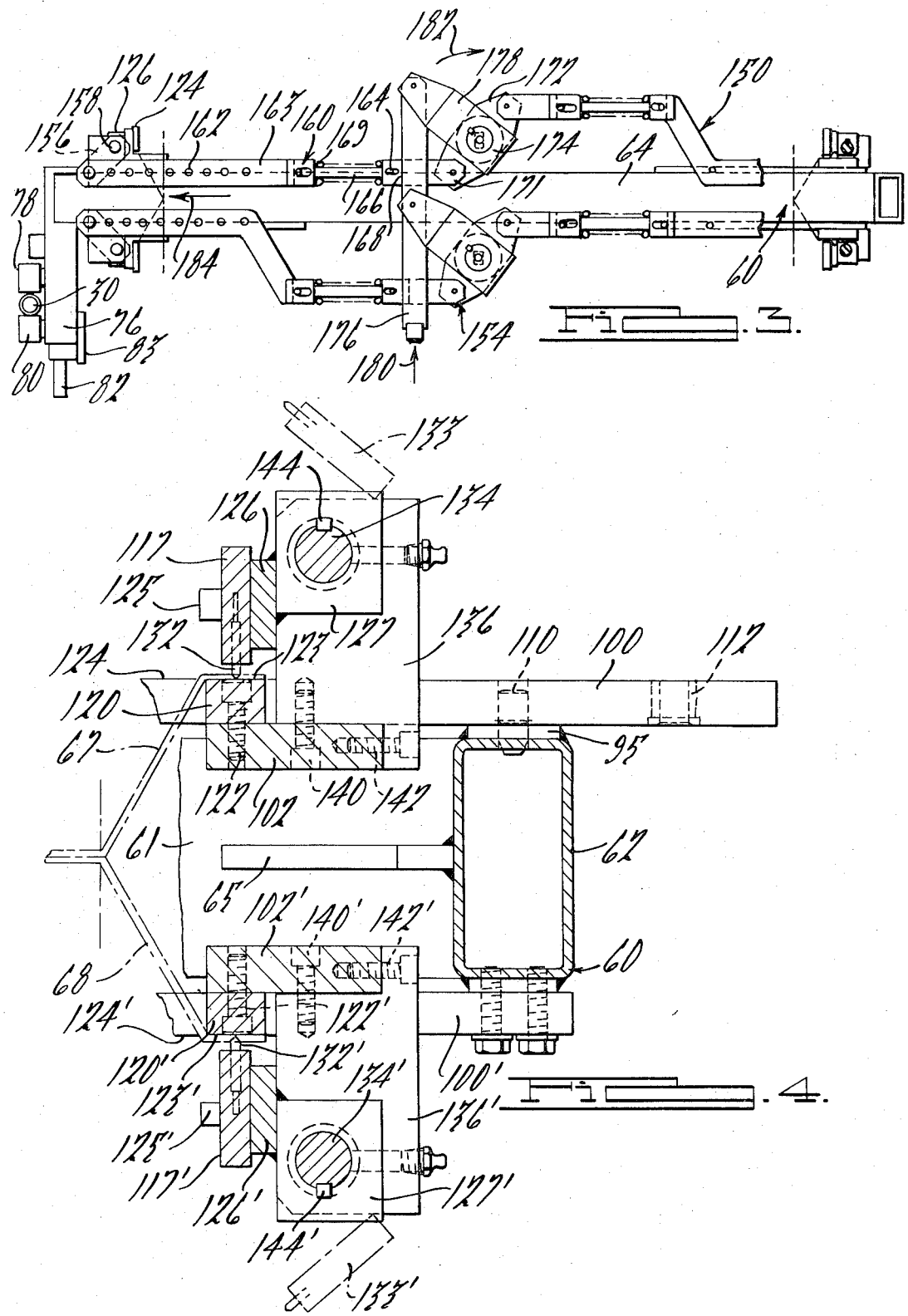

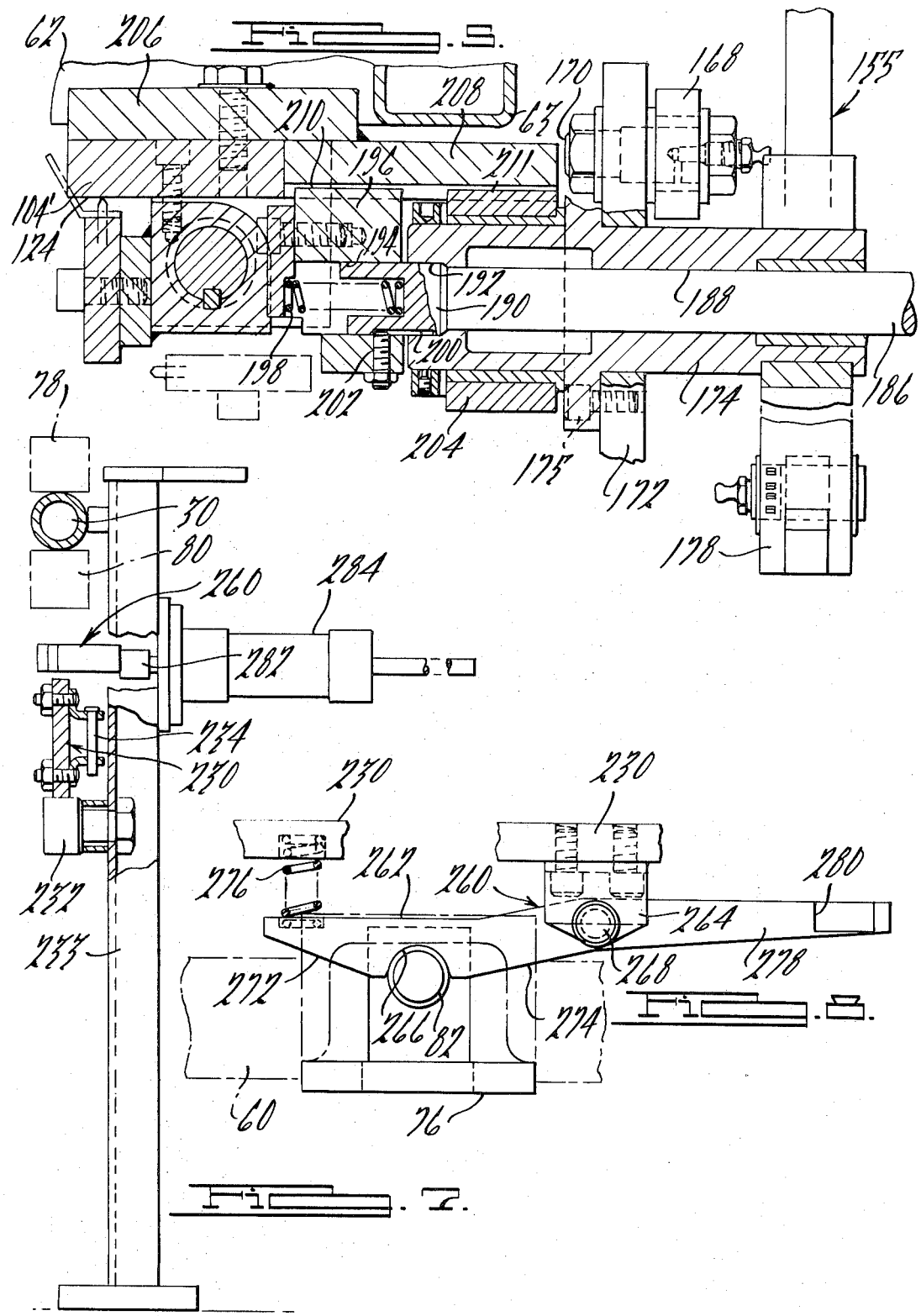

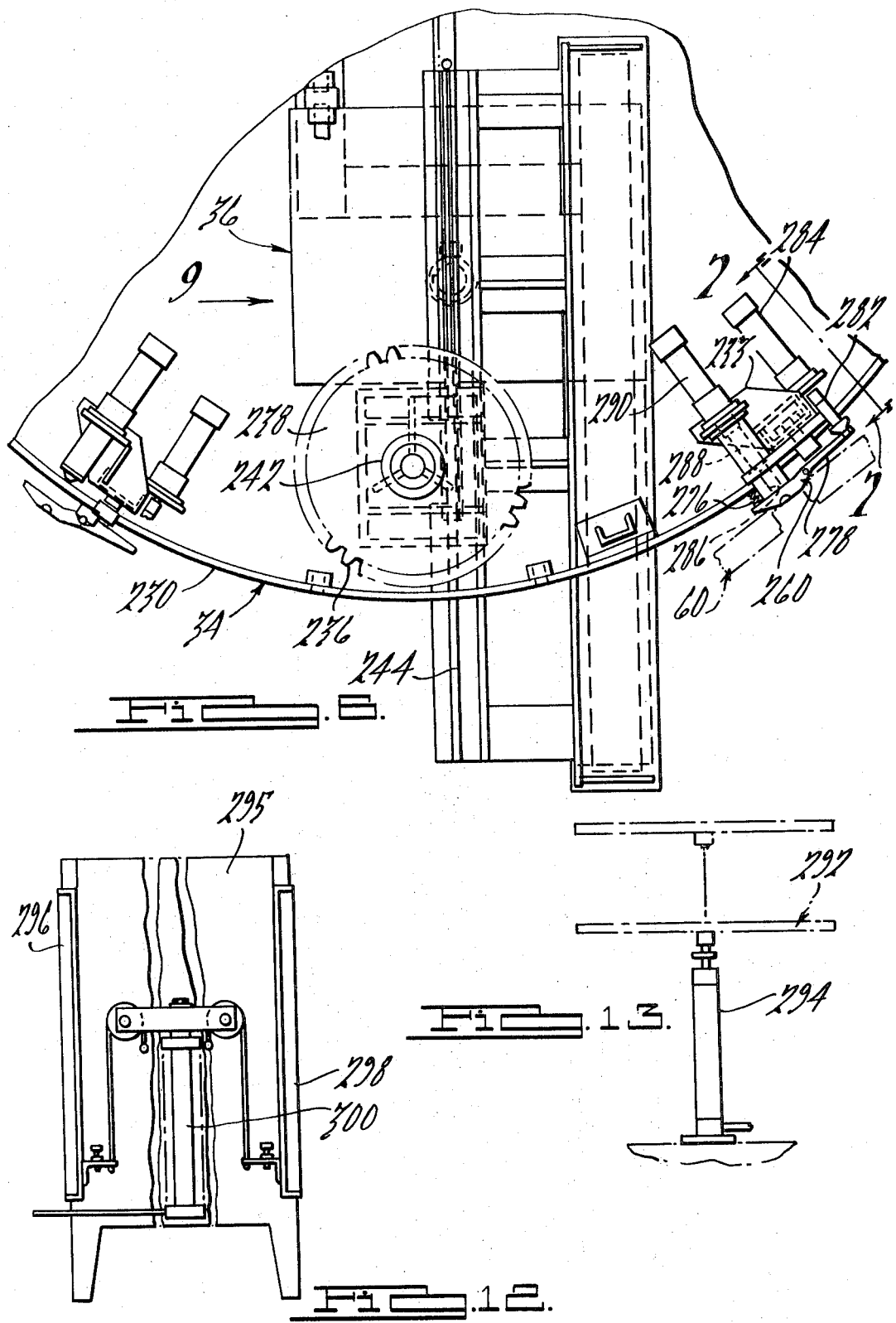

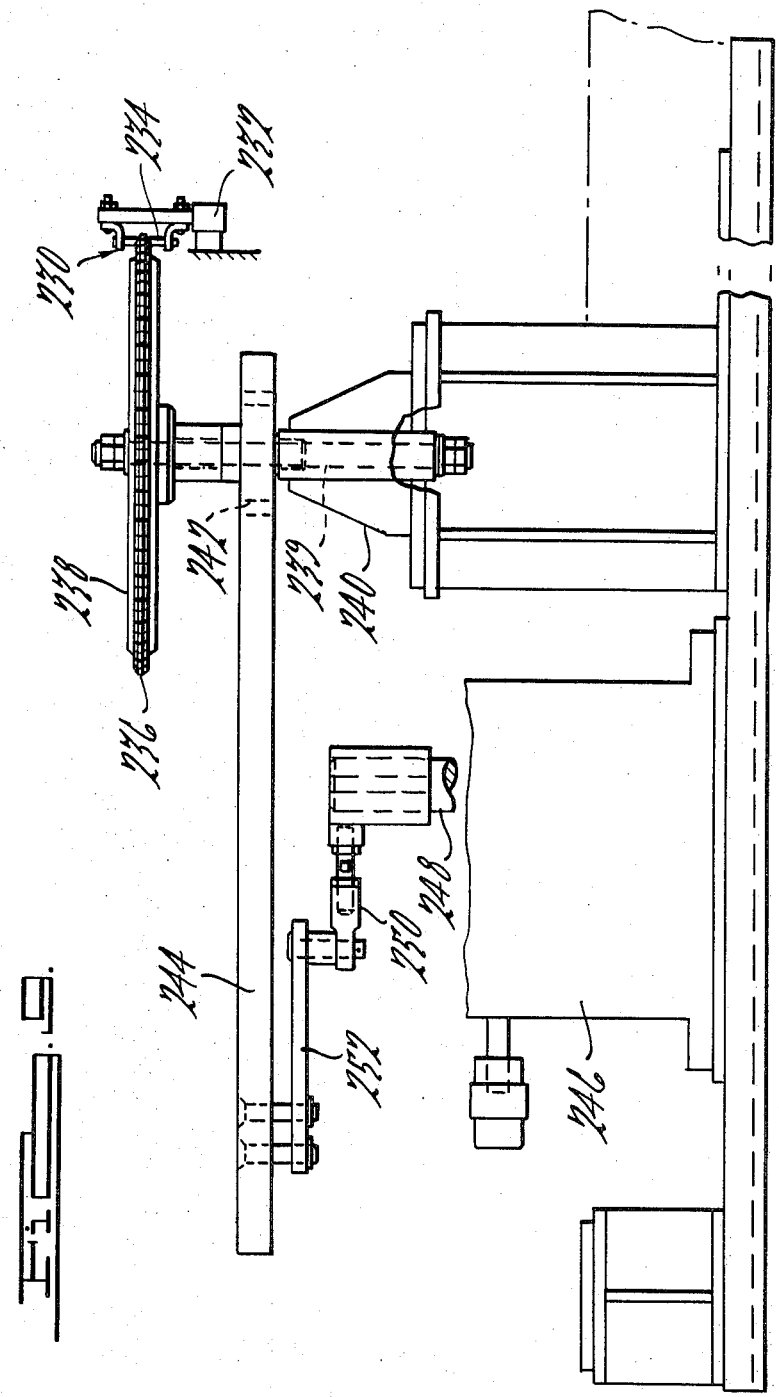

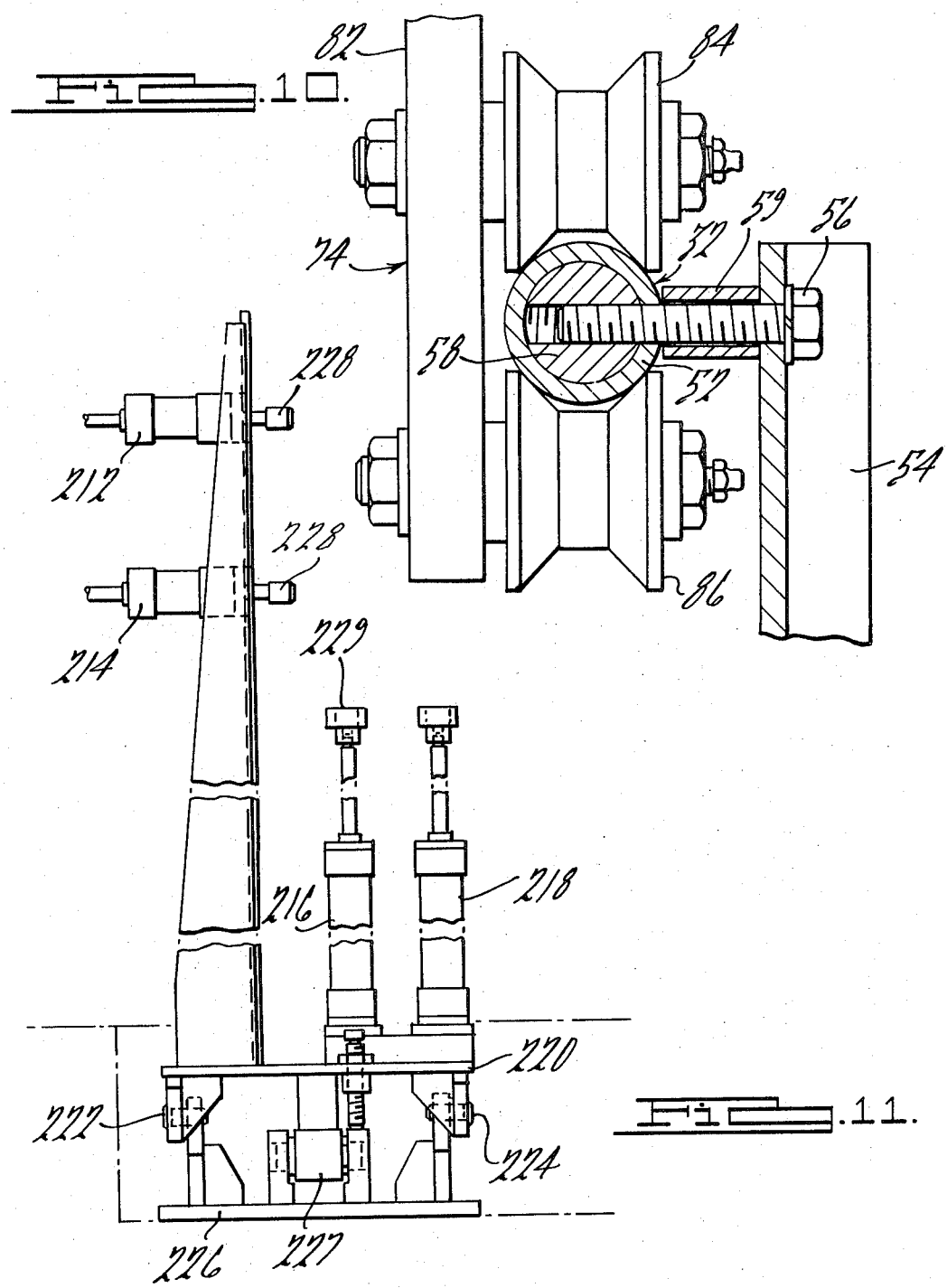

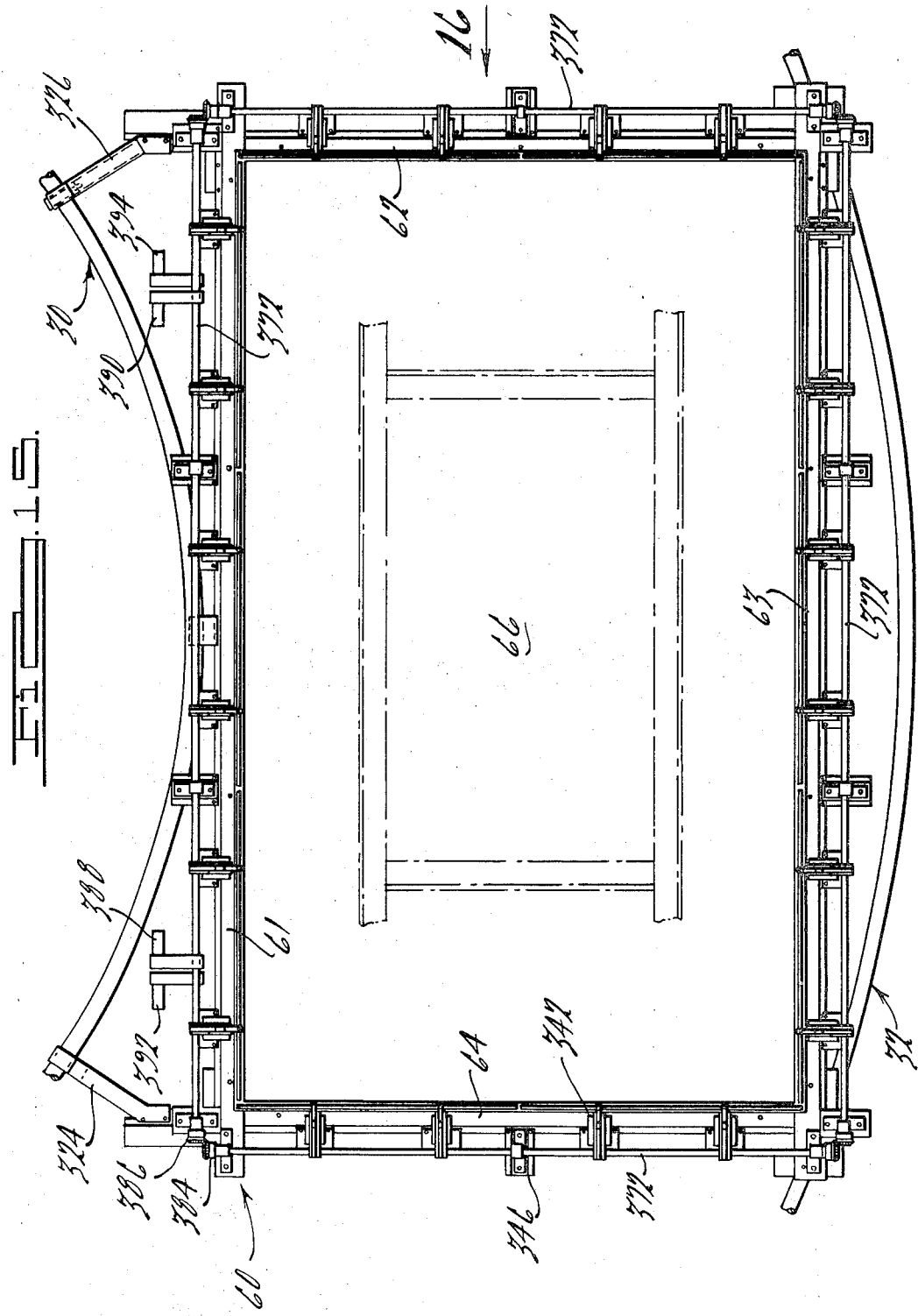

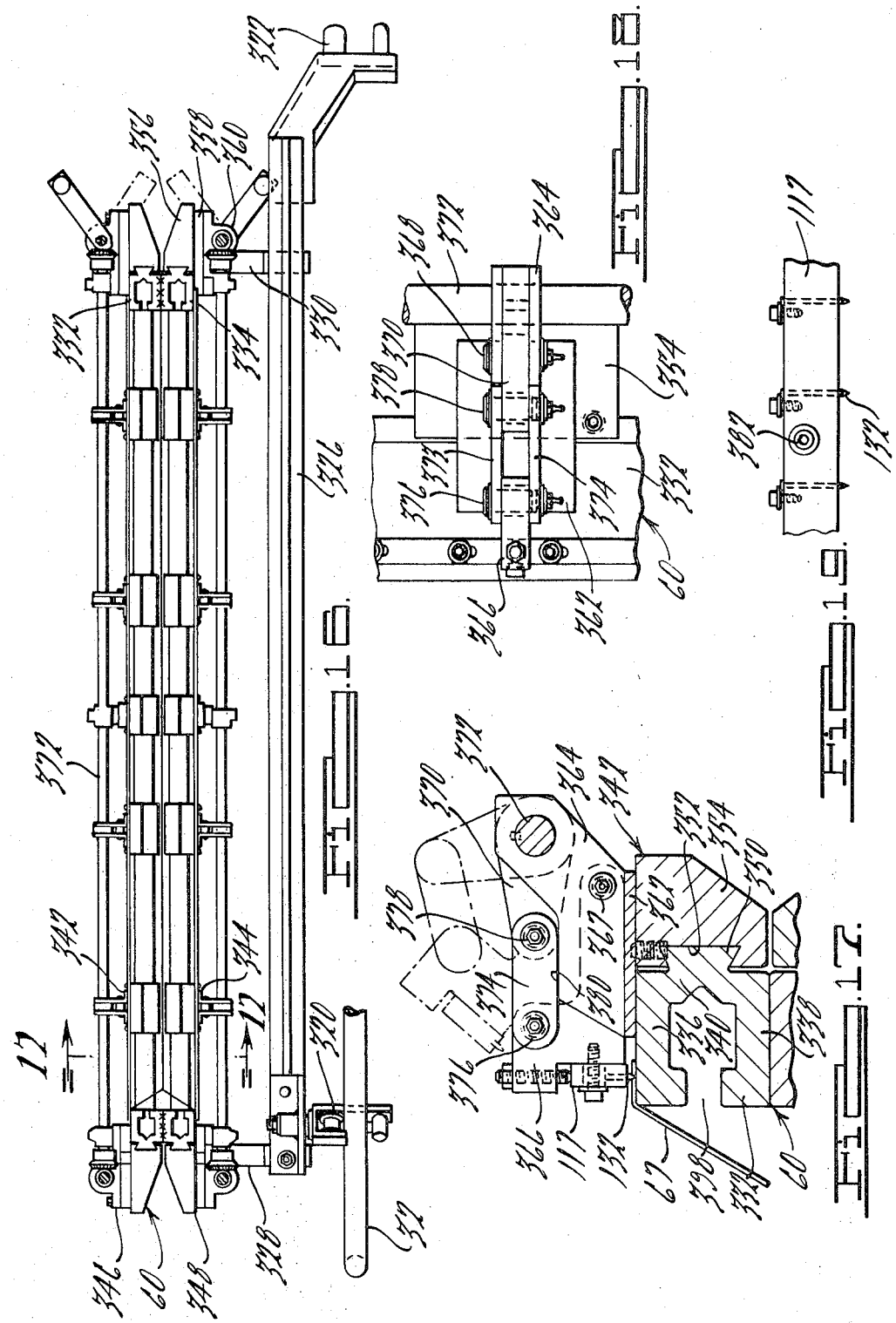

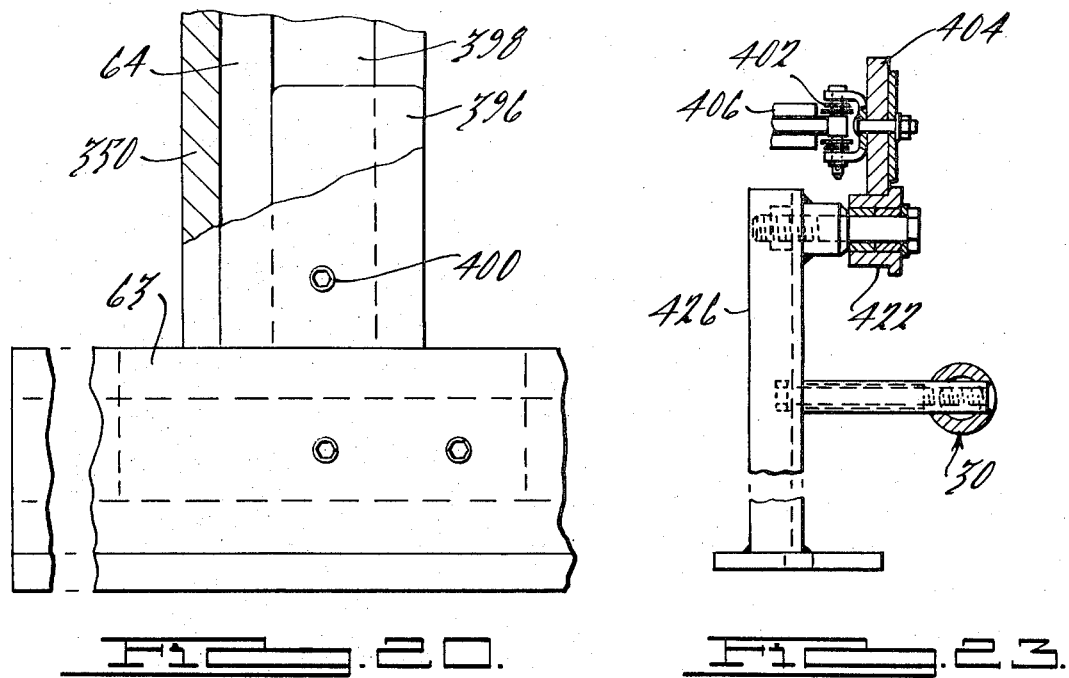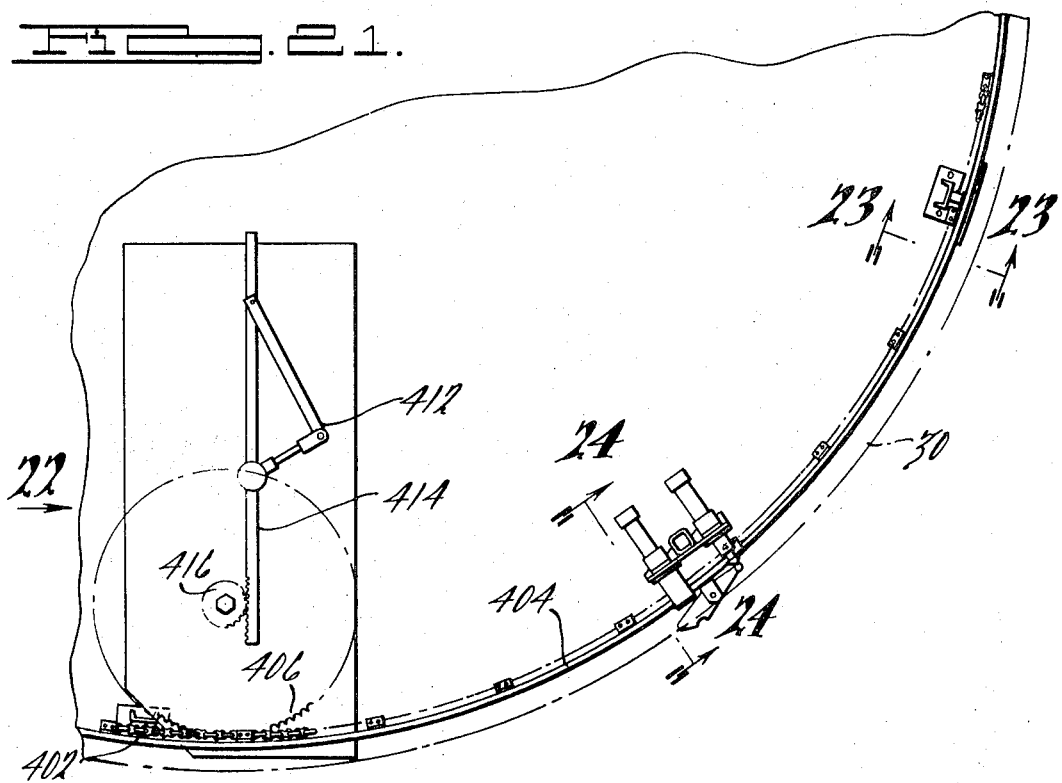

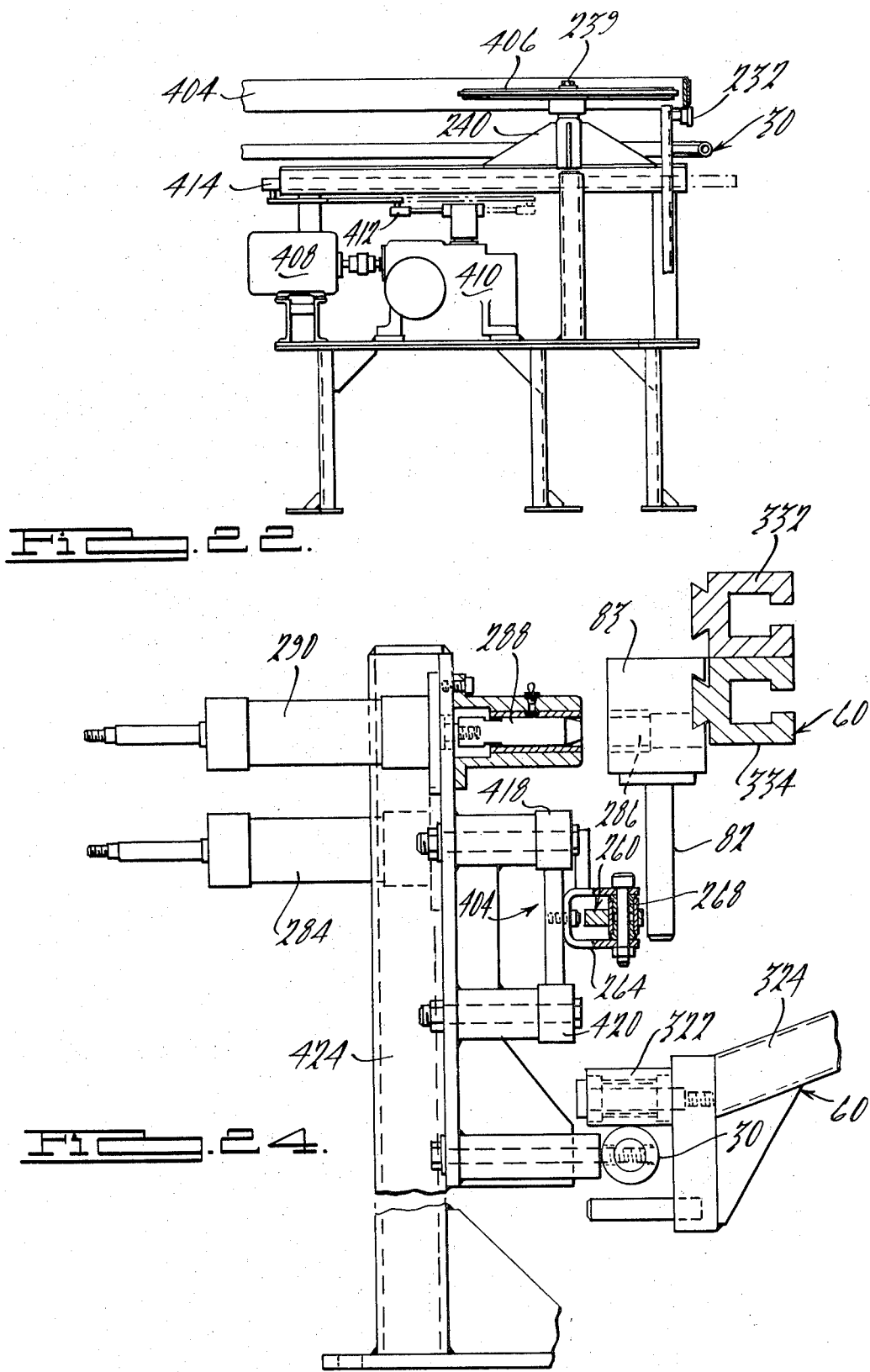

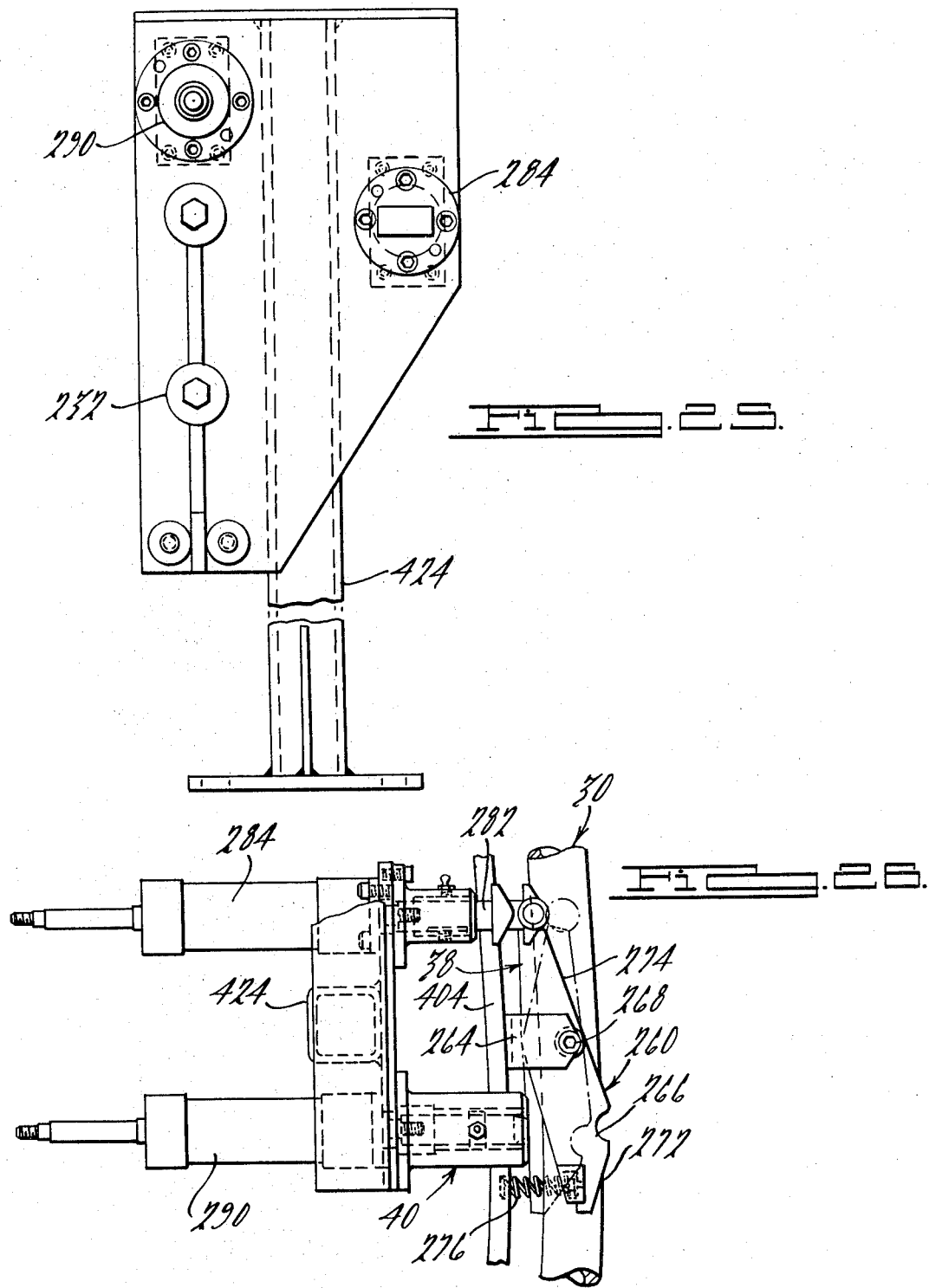

APPARATUS FOR FORMING PLASTIC SHEETS

SUMMARY OF INVENTION

The inventive principles are embodied in a vacuum forming machine by which sheets of plastic material are moved between work stations in a new and improved manner by new and improved apparatus. The work stations are arranged in a circular path and an endless track extends between the stations. A plurality of new and improved forming frames carry the plastic material from station to station on the track. The forming frames are movable independently or collectively by a separate transfer mechanism. Clamping means are carried by the forming frames and are arranged to clamp one or more sheets of plastic sheet material of varying sizes across a forming space. The clamping means are adjustably mounted on the forming frames to permit the forming space to be varied in size. Automatically operable clamp actuating means are carried on the frame means and arranged to be opened and closed at the load-unload station to permit unformed plastic sheet material to be mounted on the forming frames and formed plastic sheet material to be removed from the forming frames. The clamp actuating means are automatically operated by a fluid motor separate from the forming frames and mounted at the load-unload station.

The machine is distinguished by its flexibility in use, permitting any desired sequence of movement of the forming frames. The machine is also extremely sturdy and stable, the construction being compatible with the use of a four post press which accurately guides the press ram. The forming frames are gradually accelerated and decelerated as they move between stations, thus avoiding undesired "swing" of the sheets. If desired, the forming frames can be stopped and opened for the loading of inserts between a pair of sheets being formed. Power for clamping and unclamping the sheets comes from a fixed location, thus avoiding the use of fluid power cylinders on the forming frames.

BRIEF DESCRIPTION OF THE DRAWING

FIG. 1 is a schematic plan view of a vacuum forming machine embodying the various inventive concepts;

FIG. 2 is an enlarged plan view of a portion of the machine showing a forming frame on a portion of a circular track;

FIG. 3 is an end view of the apparatus shown in FIG. 2 taken along the line 3—3;

FIG. 4 is an enlarged sectional view of a portion of the apparatus shown in FIG. 2 taken along the line 4—4;

FIG. 5 is an enlarged sectional view of another portion of the apparatus shown in FIG. 2 taken along the line 5—5;

FIG. 6 is an enlarged plan view of another portion of the machine showing a transfer mechanism by which the forming frame is moved from station to station in the machine;

FIG. 7 is an enlarged side elevational view of a portion of the apparatus shown in FIG. 6 taken along the line 7—7;

FIG. 8 is an enlarged plan view of another portion of the apparatus shown in FIG. 6;

FIG. 9 is a side elevational view of a portion of the apparatus shown in FIG. 6 taken in the direction of the arrow 9;

FIG. 10 is an enlarged cross-sectional view of a portion of the apparatus shown in FIG. 2 taken along the line 10—10;

FIG. 11 is a side elevational view of clamp actuating apparatus shown schematically in FIG. 1;

FIG. 12 is a schematic view in side elevation of load-unload apparatus;

FIG. 13 is a schematic view in side elevation of heating oven apparatus;

FIG. 15 is an enlarged plan view, similar to FIG. 2, showing an alternative and presently preferred forming frame;

FIG. 16 is an end view of the apparatus shown in FIG. 15;

FIG. 17 is an enlarged side elevational view of a portion of the apparatus shown in FIG. 15;

FIG. 18 is an enlarged plan view of a portion of the apparatus shown in FIG. 15;

FIG. 19 is an end view of a portion of the apparatus shown in FIG. 18;

FIG. 20 is another enlarged plan view of a portion of the apparatus shown in FIG. 15;

FIG. 21 is an enlarged plan view, similar to FIG. 6, showing an alternative and presently preferred form of transfer mechanism;

FIG. 22 is a side elevational view of a portion of the apparatus shown in FIG. 21 taken in the direction of arrow 22;

FIG. 23 is an enlarged side elevational view of another portion of the apparatus of FIG. 21 taken along the line 23—23;

FIG. 24 is an enlarged side elevational view of still another portion of the apparatus of FIG. 22 taken along line 24—24;

FIG. 25 is a rear view of the apparatus of FIG. 24; and

FIG. 26 is a plan view of the apparatus of FIG. 24.

IN GENERAL

Figure 14:
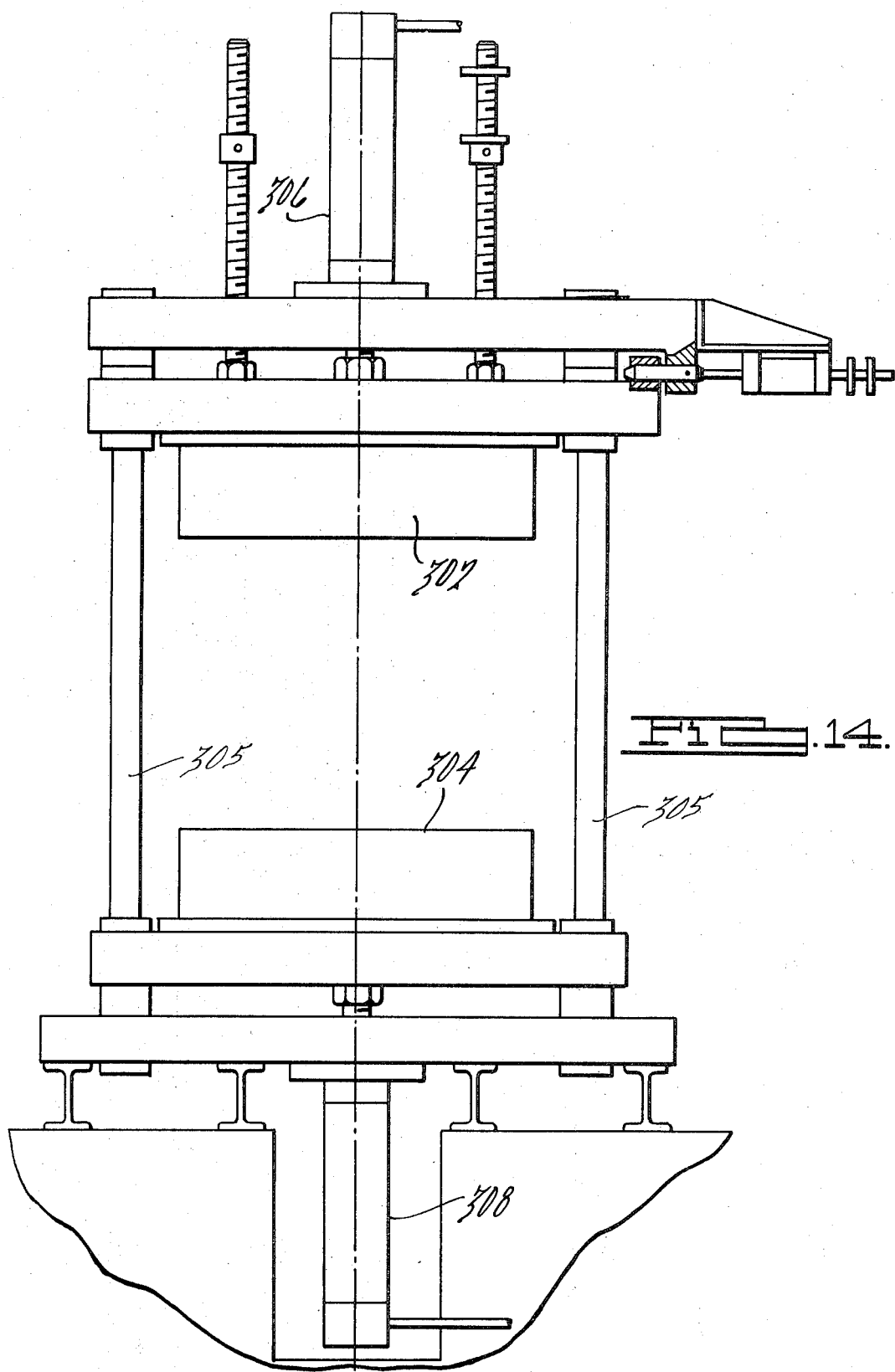
FIG. 14 is a schematic view in side elevation of a vacuum forming press apparatus.

Referring to FIG. 1, the vacuum forming machine of the present invention is schematically shown to comprise a plurality of circularly arranged stations 10, 12, 14, 16, 18. A plurality of movable forming frame means 20, 22, 24, 26 are provided to carry plastic sheet material to the various stations along circular track means formed by inner and outer circular rail means 30, 32. The forming frame means are selectively moved along the track means by transfer apparatus in the form of a drive ring means 34 and a drive motor means 36. The forming frame means are releasably connected to the drive ring means by latch means 38 and are held on station by locking means 40. Clamping means, shown in FIGS. 2-4, are provided on the forming frame means for holding one or more sheets of plastic material in forming position. Clamp actuating means 42, 44 and load-unload apparatus 46 are located at the load-unload station 10. An idle station 12 may be provided to permit variations in the length of time of heating of the plastic sheet material in first and second heating stations 14, 16 whereat the forming frame means pass through heating oven apparatus 48, 50 of any suitable design. The heated plastic sheet material is moved from the oven apparatus to vacuum forming press apparatus 52 of any suitable design at station 18. As will be understood by those skilled in the vacuum forming art, the number of stations, the processing steps, and the sequence of processing may be varied as necessary or desirable depending upon the plastic material being formed, the number of sheets being formed, the size and shape of the article being formed, the use of inserts, and the other design factors normally taken into consideration in the vacuum forming art.

TRACK MEANS

As shown in FIG. 10, the inner and outer circular rail means 30, 32 each comprise a tubular member 52 fixedly secured to a plurality of support stanchions 54 circumferentially spaced about the track by suitable fastening means 56 in the form of a threaded bolt held by a threaded rod-like nut member 58 mounted within the tubular member 52. A sleeve 59 spaces the rail means from the stanchions.

FORMING FRAME MEANS

Referring now to FIGS. 2–4, each of the forming frame means comprises a main support frame 60 having four sides 61, 62, 62, 64 of hollow tubular metallic material suitably welded and braced at the corners as indicated at 65. The support frame defines an open forming cavity 66 across which upper and/or lower sheets of plastic material 67, 68, FIG. 4, are supported for vacuum forming operations. Guide and support means in the form of sets of roller means 70, 72, 74, FIG. 2, are suitably attached to the support frame 60 to provide a three point suspension permitting rolling movement of the frame means from station to station. As shown in FIG. 3, the inner track roller means 70 comprises a roller bracket 76 suitably fixedly centrally mounted on the inner side 61 of the support frame. A portion of the roller bracket extends beneath the support frame and rotatably supports a pair of flat sided roller elements 78, 80 which receive the inner track rail 30 therebetween. A transfer pin 82 depends from bracket 76 in central alignment with the roller elements 78, 80 midway along the inner frame side 61. A locking pin housing 83 is mounted on the bracket 76 above the roller elements. As shown in FIG. 10, each of the sets of outer track roller means 72, 74 comprises a roller bracket 82 suitably fixedly attached to opposite corners of the outer side 63 of the frame member and extending outwardly therefrom generally tangentially relative to the outer track rail 32. A pair of grooved roller elements 84, 86 are suitably rotatably mounted on a downwardly depending portion of the bracket 82 and receive the outer track rail 32 therebetween. Thus, the forming frame is movably supported by a three point suspension comprising roller elements rotatable about three circumferentially spaces axes 88, 90, 92 located on radial lines extending through coincident centers of the inner and outer track rails 30, 32. Mounting plates 94, 95, 96, 97, FIG. 2, are fixedly secured on the upper side of the frame member and proved with a plurality of mounting holes 98 for a purpose to be hereinafter described. Similar mounting plates (not shown) are fixedly secured on the bottom side of the frame member.

CLAMPING MEANS

Upper and lower clamping means are provided along each side 61, 62, 63, 64 of the forming frame to hold upper and lower sheets of plastic material across the forming cavity 66. The upper and lower clamping means are of substantially identical construction except as hereinafter discussed in detail and the general description of the clamping means along any one side of the forming frame will be understood also to be descriptive of the clamping means along the other sides of the forming frame. Referring now to FIG. 2, the upper clamping means is shown to comprise four upper clamping plates 100, 102, 104, 106 which extend parallel to the sides of the forming frame and are adapted to be adjustably inwardly spaced relative thereto. Opposite plates 100, 104 are of identical construction and removably adjustably secured at opposite ends to mounting plates 94, 95 and 96, 97, respectively, by suitable fastening means 108, 110. Opposite ends of each plates 100, 104 are provided with a plurality of equally spaced mounting holes 112, 113. Opposite plates 102, 106 are of identical construction and removably and adjustably secured at opposite ends to plates 100, 104 by suitable fastening means 114, 115. Four lower clamping plates of similar design are removably adjustably secured to the bottom of the forming frame. Thus, the upper and lower clamping plates are adjustably movable relative to the forming frame and to each other to vary the area of the forming opening 66 between a maximum area, as shown in FIG. 2, and a minimum area as shown in phantom at 100', 102', 104', 106'.

The clamping means further comprises movable jaw means 116, 117, 118, 119 extending along each of the clamping plates 100, 102, 104, 106. Four lower jaw means of similar design extend along the lower clamping plates. As shown in FIG. 4, the upper and lower clamping plates 102, 102' extending along frame side 62 include a fixed jaw bar means 120, 120' removably attached to plates 102, 102' by suitably threaded fastening means 122, 122' to provide gripping surfaces 123, 123' which will be aligned with gripping surfaces 124, 124' on clamping plates 100, 100'. Thus, in order for the plates 100, 104 to be moved toward each other, the length of the fixed jaw bar means 120, 120' may be changed as by replacing the fixed bar means with bar means of another length or by utilizing sectionalized bar means which can be removed or added as necessary. Fastening means 125, 125' in movably jaw means 117, 117' are also removably mounted on support plates 126, 126' to permit corresponding changes in length. Support plates 126, 126' are fixedly attached to pivotally mounted support blocks 127, 128, FIG. 2. Gripping pins 132, 132' are carried by the movable jaw means to engage the edges of the sheet material and hold the edges of the sheet material on the fixed jaw bar.

Each of the jaw means are movably between a closed gripping position and an open release position, as shown in phantom in FIG. 4 at 133, 133' by an actuating rod 134, 134' rotatably mounted in spaced bearing blocks 136, 138, 139, FIG. 2, fixedly attached to the plate 102, 102' by suitable fastening means 140, 140', 142, 142'. Jaw support blocks 127, 127' are keyed to rod 134, 134' as indicated at 144, 144' so as to be pivotally movable therewith. Torsion spring means 146, FIG. 2, bias the jaw means toward the open position and actuate the jaw means from the closed position to the open position as will be hereinafter described in detail.

The jaw means along the upper and lower portions of frame sides 61, 63 are of slightly different construction in that the clamping surfaces 124 are provided by the support plates 104' as shown in FIG. 5.

CLAMP ACTUATING MEANS

The clamp actuating apparatus comprises linkage means mounted on the forming frame and separate fluid motor means mounted on the machine frame at the load-unload station. There are two sets of linkage means on each of the upper and lower sides of the forming frame. Each set of linkage means operates two opposite clamping bar means. Thus, with respect to the two sets of linkage means for the upper side of the forming frame as shown in FIG. 2, one set of linkage means 150 extends along frame side 64 and actuates opposite jaw means extending along opposite frame sides 61, 63 while the other set of linkage means 152 extends along frame side 63 and actuates opposite jaw means extending along opposite frame sides 62, 64. It is to be understood that there are two additional sets of linkage means for the lower side of the forming frame which are of identical construction with one lower linkage means 154 being located in lowered and transverse spaced relationship to upper linkage means 150 and another lower linkage means, shown partially at 155 in FIG. 5, being located directly beneath upper linkage means 152.

Referring now to FIG. 3, each linkage means comprises a rod connecting link 156 fixed at one end to the end 158 of the operating rod and pivotally connected at the other end to transverse link means 160. A plurality of connecting holes 162 are provided in an adjustment segment 163 of the transverse link means 160 to accommodate adjustments in the position of the associated jaw means relative to the forming frame. The transverse link means 160 includes lost motion means in the form of a pin and slot connection at 164 between one end of a rod segment 166 and the adjustment segment 163. The other end of the rod segment is fixed to a connecting segment 168 and a compression spring 170 is mounted between the adjustment segment and the connecting segment to bias them apart to take up any slack and maintain the jaw means in full clamping engagement with the sheet material even during dimensional changes caused by the high temperature oven environment. Each transverse link is pivotally connected at 171 to one end of a rotatable drive link 172 fixed by suitable fastening means 175, as shown in FIG. 5, to a rotatable control shaft 174 selectively actuable by a pull rod 176 through a connecting link 178 fixed to the control shaft at one end and pivotally connected to the pull rod at the other end. Thus, in the open position (not shown) upward movement of the pull rod 176 in the direction of the arrow 180, FIG. 3, rotates control shaft 174 and drive link 172 in the direction of arrow 182. Transverse link means 160 is pushed in the direction of the arrow 184 and rod connecting link 156 pivots about the axis of rod 158 which rotates in bearing blocks 136, 138, 139 and moves the jaw means to the closed position against the bias of the torsion springs 146.

Referring now to FIG. 5, movement control means are associated with each control shaft 174 and comprise a release rod 186 slidably supported in a central control shaft bore 188. An enlarged inner end 190 of the release rod is slidably recieved in an enlarged counter bore 192 in the control shaft 174 and in a bore 194 in a reaction block 196 fixed relative to the support plate 104' and the forming frame. The release rod is movable between a holding position, as shown in FIG. 5, and a release position (not shown) with the enlarged inner end located entirely within the bore 194. In the release position, the compression springs 170 and the torsion springs 146 are effective to move the jaw means and the linkage means to the open position. A compression spring 198 biases the release rod toward the holding position whereat key means 200, 202 are effective to prevent rotation of the control shaft 174 relative to the release rod and the fixed block 196. Each control shaft and associated apparatus are centrally mounted on one of the support plates 104, 106 by a bearing housing 204 mounted on bracket means in the form of plates 206, 208 which are fixedly secured to the support plate by suitable fastening means (not shown). The bearing housing 204 and reaction block 196 are adjustably slidably mounted on bracket means 208 by gib means 210, 211 permitting adjusting movement of the support plate 104' relative thereto. The length of the bracket means may be varied as necessary to accommodate inward adjustment of the support plates 100, 102, 104, 106.

The linkage control shafts 174 and the release rods 186 are manually operable by use of a suitable tool or automatically operable during machine operation by force applying means 42, 44 in the form of air operated power cylinders 212, 214, 216, 218, FIG. 11, separate from the forming frame. Thus, the power cylinders are not subject to the adverse effects of the heating ovens as would be the situation if they moved with the forming frame. Furthermore, the power cylinders are permanently connected to the air lines and the machine control system. The power cylinders located at 44 within the path of movement of the forming frame are mounted on a movable platform 220 pivotally mounted as at 222, 224 on a fixed base 226 for movement between an upright operating position located adjacent the control shafts and release rods and a lowered position (not shown) permitting movement of the forming frame from the load-unload station. Movement of the platform may be automatically controlled by a power cylinder 227. In the raised operating position, the rod ends 228 of power cylinders 212, 214 are actuable in a horizontal line to abuttingly operably engage and move the adjacent upper and lower release shafts to the release position whereat the jaw means spring open. In order to close the jaw means, cylinders 216, 218 are actuable to engage rod ends 229 with the adjacent upper and lower control shafts 174 and move the jaw means to the closed position. Then power cylinders 212, 214 are moved rearwardly to permit the release rods to move to the holding position.

TRANSFER APPARATUS

The forming frames 20, 22, 24, 26 are selectively movable from station to station around the track means by transfer apparatus 34, 36 comprising toothed drive ring means 230 rotatably supported by a pluraltiy of roller elements 232 suitably attached to a plurality of circumferentially spaced stanchion members 233 as shown in FIG. 7. Tooth means 234 are provided on the inner side surface of the drive ring for driving engagement with tooth means 236 on a sprocket type drive wheel 238 rotatably supported on a shaft 239 by bracket means 240 as shown in FIG. 9. A drive pinion 242 is drivingly connected to the sprocket wheel shaft and drivingly engageable by an elongated rack member 244 which is suitably slidably supported for reciprocating movement relative to the pinion 242. A suitable motor means 246, in the form of a rotatable electric motor and reducer having a drive shaft 248, is drivingly connected to the rack 244 by an arm 250 pivotally connected to a drag link 252. The arrangement is such as to impart a harmonic motion to the rack and cause a predetermined length of circumferential displacement of the drive ring 230 with uniform acceleration from zero velocity to maximum velocity and deceleration from maximum velocity to zero velocity during each 180° of rotation of the arm 250.

The forming frames are selectively coupled to the driving ring means 230 by an equal number of coupling means 260, FIG. 8, each comprising a latch arm 262 pivotally mounted on the drive ring 230 by a bracket means 264. A detent groove 266 is provided on one side of the pivotal connection 268 and releasably receives the drag pin means 82 fixed to the forming frame 60 by bracket 76 as shown in FIGS. 3 and 8. The side surfaces 272, 274 of the latch arms adjacent the detent groove 266 are inclined to provide cam ramps for the drag pin. Compression spring means 276 bias the latch arms toward an outwardly extended latching position. A release handle 278 extends from the other side of the pivotal connection 268 and is provided with a slot 280 adapted to receive the end of an actuating rod 282, FIG. 6, of a power cylinder 284 mounted on stanchion 233 to move the latch arm 260 to a release position against the bias of the compression spring. Thus, whenever a forming frame is connected to the drive ring by a latch arm as shown in FIGS. 6 and 8, circumferential displacement of the drive ring causes corresponding circumferential displacement of the forming frame. Whenever it is desired to release a forming frame from the drive ring, the power cylinder 284 is actuated and the latch arm 260 is pivoted away from the drag pin to the release position. In order to provide a positive latch at the various stations, a locking means is provided at each station in the form of an aperture 286 in the forming frame and a locking pin 288 operable by a power cylinder 290 as illustrated schematically in FIG. 1.

THE PROCESSING APPARATUS

The processing apparatus is of generally conventional design adapted for use with the aforedescribed machinery. As shown schematically in FIG. 13, the loading and unloading means 46 may be in the form of an elevator platform 292 operable by a power cylinder 294 at the load-unload station. The heating apparatus 48, 50 may comprise a single oven enclosure or separate oven enclosures. The presently preferred form, shown schematically in FIG. 12, comprises a single oven housing 295 having vertically movable sliding doors 296, 298 through which the forming frames enter and leave the oven. A power cylinder 300 may be provided to open and close the doors prior and subsequent to transfer of the forming frames. The forming press 48, shown schematically in FIG. 14, comprises upper and lower platens 302, 304 guided by four vertical posts 305 for vertical movements into forming positions under the power of actuating cylinders 306, 308. As can be seen in FIG. 1, two other posts 305 are located radially outwardly of the track 30, 32, while two of the posts 305 are located on the radially inner side of the track. It will be understood that the various power cylinders and transfer apparatus are provided with suitable limit switches, power cylinder controls, and electrical controls of conventional design to coordinate the various machine movements.

ALTERNATIVE EMBODIMENTS

Referring now to FIGS. 15–20, a presently preferred embodiment of the forming frame means is shown to comprise a four-side frame 60 movably supported by a circumferentially spaced pair of outer track roller means 30, and a circumferentially spaced pair of inner track roller means 322, there being one of each mounted at opposite ends of support bars 324, 326 depending from the frame on adjustable brackets 328, 330. Each side 61, 62, 63, 64 of the frame comprises a pair of abutting extruded hollow aluminum side rails 332, 334 of similar U-shaped cross-sectional configuration, defined by leg portions 336, 338 and a connecting portion 340, connected by suitable bolt means or by welding.

Upper and lower clamping block assemblies 342, 344 and bearing block assemblies 346, 348 are adjustably slidably mounted in spaced relationship on the side rails by connecting means in the form of a dove-tail type tongue 350 on the rail and a corresponding groove 352 in support blocks 354, 356. The bearing block assemblies 346, 348 comprise a spacer plate 358 and a bearing housing 360 bolted to a support block 356. The clamping block assemblies 342 comprise a support plate 362 welded to support block 354, a bifurcated bracket 364, a clamp arm 366 within the bifurcated bracket and pivoted relative thereto at 368; a first link 370 within the bifurcated bracket and pivoted on rotatable shaft 372 to which it is keyed, a pair of connecting links 373, 374 pivoted at one end to the clamp arm at 376 and at the other end to the link 370 at 378 amd being coplanar with the side walls of the bifurcated bracket and abuttingly engaging parallel surfaces 380 thereof in a clamping position, and a clamping bar 117 carrying clamping pins 132 and attached to the clamp arm by threaded fastening means 382.

The arrangement is such as to provide an overcenter-type linkage action whereby the clamp arm 366 is positively movable between a closed clamping position, shown by the solid lines in FIG. 17, or an open unclamped position, shown in phantom. There may be one clamp actuating shaft 372 for each upper side and each lower side of the frame, there being eight shafts in total or one or more of the shafts may be split to decrease the torque load. The four shafts on the upper sides of the frame and the four shafts on the lower sides of the frame are connected at the corners by spur gears 384, 386 so as to be actuable as a unit by upper and lower crank arms 388, 390, and 392, 394, respectively, spaced at opposite ends of the inner side rails for engagement by power operable means such as air or hydraulic powered operating cylinders (not shown). The sides of the frame may be cross-connected at the corners by an L or T-shaped insert 396 corresponding in size and cross-sectional configuration to the extrusion cavity 398, FIG. 17, and held therein by threaded fastening means 400 as shown in FIG. 20. The extruded aluminum rails have the additional advantages of being quick cooling after leaving the ovens and non-adherent to the heated plastic sheet. The size of the forming opening 66 may be varied as indicated in FIG. 15 by utilizing different length side rails with the inner and outer side rails remaining the same and supporting the frame on the tracks by the roller elements attached thereto.

Referring now to FIG. 21–26, a presently preferred embodiment of the drive means is shown to comprise a chain segment 402 extending circumferentially 90° and fixed to a drive ring 404 extending 360°. A drive gear 406 continuously engages the chain segment 402 and is driven by an electric motor 408 through a gear box 410, an oscillatory linkage 412, a rack 414, and a pinion 416. The drive ring is slidably supported by roller elements 418, 420, 422 mounted on support stanchions 424, 426 which also support the inner rail 30 as shown in FIGS. 23–24.

The latch means 38 for selectively connecting the drive mechanism to the carriages is similar to that previously described and is best shown in FIGS. 24–26, to be mounted in circumferentially spaced relationship on the drive ring 404 for latching engagement with each of the frame means. As previously described, each latch means comprises a control arm 260 centrally pivoted at 268 to a bracket 264 fastened to the drive ring. A notch 266 receives the carriage drag pin 82 in the transfer position. A compression spring 276 normally biases the control arm to the transfer position while permitting pivotal movement away from the drag pin during engagement and disengagement. A station locating pin 288 operable by a power cylinder 290 is movable into engagement in a locating aperture 286 in the drag block 83 of each carriage to locate and hold the carriage on station after transfer between stations. A cam pin 282 operable by a power cylinder 284 releases the control arm 260 after transfer on the carriages to permit return movement of the drive ring.

In operation, the compression spring normally holds the control arms in operative engagement with the drag pins of each frame. With the locating pin and the release pin retracted, the frames are transferred to the next station by rotating the drag linkage 412 180° which slidably moves the chain segment 402 and the drive ring 404 circumferentially the distance between stations. The compression spring 276 maintains the control arm 260 in engagement with the drag pin 82. When the frames are on station, power cylinder 290 is actuated to move the locating pin 288 into locating aperture 286 on the frame drag block and hold the frames on station. Then, the power cylinder 284 is actuated to move the release pin into engagement with and cam the control arm to the release position relative to the drag pin. Then the drag linkage 412 is moved another 180° to return chain segment 402 and drive ring 404 to the starting position. When the control arms approach the starting position, cam surfaces 274 engage and are cammed away by the drag pins 82 on the frames until the frames are on station whereat the drag pins are again located in the notches on the control arms ready for the next transfer movement. In the event that it is desired to leave a frame on station during a transfer movement, the release cylinder 284 may be actuated to move the control arm to the release position.

It will be apparent that the inventive concepts and principles may be variously otherwise embodied and it is intended that the appended claims be construed to cover alternative embodiments except insofar as limited by the prior art.

I claim:

1. A vacuum forming machine for vacuum forming plastic articles from plastic sheet material comprising: a plurality of independently movable forming frame means for carrying plastic sheet material to various processing stations and for supporting the plastic sheet material at the processing stations, endless track means for guiding said movable frame means, processing apparatus for processing the sheet material located in spaced relationship at a plurality of processing stations spaced along said track means, drive means for advancing said frame means along said track means from station to station for processing of the plastic sheet material by said processing mechanisms and means for individually and selectively coupling each of said frame means to said drive means.

2. The invention as defined in claim 1 and wherein said forming frame means comprises:
   a four-sided frame defining an enclosed forming space, releasable clamping means on said frame means for clamping plastic sheet material in a forming position extending across said forming space and being movable therewith on said track means, and
   clamp actuating means on said frame means operable between an open release position and a closed clamping position at one of the processing stations.

3. The invention as defined in claim 2 and wherein said clamping means comprises:
   a clamp surface extending along each side of said frame, and
   a clamping bar movably mounted on each side of said frame in cooperative clamping relationship with each clamping surface.

4. The invention as defined in claim 3 and wherein said clamp actuating means comprising:
   a movable actuating shaft means mounted on one side of said frame and being located between opposite sides of said frame,
   control linkage means operably connected to and extending from said movable actuating shaft means toward the opposite sides of said frame,
   movable support shaft means extending along each of the opposite sides of said frame and movably supporting a clamping bar extending along each of the opposite sides of said frame, and
   connecting means operably connecting said control linkage means to said movable support shaft means whereby actuation of said actuating shaft means actuates each clamping bar between the closed clamping position and the open release position.

5. The invention as defined in claim 4 and wherein said clamp actuating means further comprises:
   force applying means separate from and fixedly mounted relative to said frame at one of the processing stations, and
   movable support means for said force applying means for moving said force applying means into and out of force applying engagement with said movable actuating shaft means at the one of the processing stations.

6. The invention as defined in claim 5 and wherein said circular track means comprises an inner circular support rail and an outer circular support rail, a toroidal processing spaced defined by said inner circular support rail and said outer circular support rail, and said forming space being located between said inner circular support rail and said outer circular support rail in alignment with said toroidal processing space.

7. The invention as defined in claim 6 and said frame being movably supported at three points on said circular track with one suspension point located on one circular support rail and the other two suspension points being located on the other circular support rail.

8. The invention as defined in claim 3 and there being upper and lower sets of clamping bars and clamp actuating means extending along each side of said frame.

9. The invention as defined in claim 8 and there being two sets of force applying means simultaneously operable to open and close said clamping bars.

10. The invention as defined in claim 4 and adjustable mounting means for said clamping bars and said actuating means whereby the position of said clamping bars and said actuating means relative to said frame may be varied between a position defining a forming space of maximum area and a position defining a forming space of minimum area.

11. The invention as defined in claim 10 and wherein said adjustable mounting means comprises:
sectionalized, removable and replaceable plate members providing said clamping surface and being removably attached to said frame, and
sectionalized, removable, and replaceable clamping bar members being removably attached to said movable support rod means.

12. The invention as defined in claim 4 and said clamping means having only mechanically actuable parts.

13. The invention as defined in claim 1 and said processing apparatus comprising:
a load and unload station whereat unformed plastic sheet material is clamped to said frame means and whereat formed plastic sheet material is removed from said frame means,
a heating station whereat the unformed plastic sheet material is heated to a formable state, and
a vacuum forming station whereat the heated plastic sheet material is vacuum formed into the desired shape.

14. The invention as defined in claim 1 and having drive means for moving said frame from station to station along said track means and comprising:

a movable drive ring movably supported adjacent said track means,
connecting means for releasably drivably connecting said drive ring to said frame means,
drive gear means drivingly connected to said drive ring, and motor means drivingly connected to said drive gear means and operable to drive said drive gear means and move said drive ring means a predetermined distance.

15. The invention as defined in claim 14 and said connecting means operating by harmonic motion to start movement of said frame with uniformly increasing speed and to stop movement of said frame with uniform decreasing speed.

16. The invention as defined in claim 14 and wherein said drive means being mounted adjacent the inside of said track means.

17. The invention as defined in claim 14 and said track means comprising an inner circular support rail and an outer circular support rail, and said processing apparatus being mounted between said inner support rail and said outer support rail.

18. The invention as defined in claim 14 and having locking means to lock the frame means to the track means at the processing stations.

19. The invention as defined in claim 14 and wherein said connecting means comprises:
drag pin means fixedly mounted on said frame means, an arm engageable with said drag pin means and
pivotally mounted on said track means for movement between a holding position and a release position relative to said drag pin means, and
a pin seat on said arm receiving and holding said drag pin means in the holding position.

20. The invention as defined in claim 1 wherein said processing apparatus includes a press having at least one platen guided for vertical movement by a plurality of guide elements located on opposite sides of said track means.

21. The invention as defined in claim 1 in which said drive means comprises an oscillatory member movable in forward and reverse directions and means for uncoupling all of said forming frame means during movement of said drive means in the reverse direction.

22. The invention as defined in claim 1 in which said drive means comprises a ring member having separate and individually actuatable latches each of which is engageable with one of said forming frame means.

* * * * *